(12) United States Patent
Kim

(10) Patent No.: US 9,875,194 B2
(45) Date of Patent: Jan. 23, 2018

(54) SECURITY SYSTEM FOR EXTERNAL DATA STORAGE APPARATUS AND CONTROL METHOD THEREOF

(75) Inventor: Sanghoon Kim, Gyeonggi-do (KR)

(73) Assignee: DataLocker Inc., Overland Park, KS (US)

( * ) Notice: Subject to any disclaimer, the term of this patent is extended or adjusted under 35 U.S.C. 154(b) by 1374 days.

(21) Appl. No.: 13/448,101

(22) Filed: Apr. 16, 2012

(65) Prior Publication Data

US 2012/0260054 A1    Oct. 11, 2012

Related U.S. Application Data

(63) Continuation of application No. 11/920,992, filed on Oct. 7, 2009, now Pat. No. 8,185,709.

(30) Foreign Application Priority Data

Oct. 10, 2006  (KR) .................. 10-2006-0098204
Oct. 2, 2007   (KR) .................. 10-2007-0099043
Oct. 2, 2007   (WO) ................ PCT/KR2007/004811

(51) Int. Cl.
  *G06F 12/14*   (2006.01)
  *G06F 21/80*   (2013.01)
  *G06F 3/06*    (2006.01)

(52) U.S. Cl.
  CPC .......... *G06F 12/1458* (2013.01); *G06F 21/80* (2013.01); *G06F 3/064* (2013.01); *G06F 3/0622* (2013.01); *G06F 3/0673* (2013.01)

(58) Field of Classification Search
  CPC .... G06F 12/1458; G06F 21/80; G06F 3/0622; G06F 3/064; G06F 3/0673; G06F 21/31; G06F 21/72
  See application file for complete search history.

(56) References Cited

U.S. PATENT DOCUMENTS

| 5,434,562 | A |   | 7/1995  | Reardon       |              |
|-----------|---|---|---------|---------------|--------------|
| 5,469,564 | A |   | 11/1995 | Junya         |              |
| 5,623,546 | A | * | 4/1997  | Hardy         | G06F 21/6209 |
|           |   |   |         |               | 380/247      |
| 5,623,637 | A |   | 4/1997  | Jones         |              |
| 5,914,941 | A | * | 6/1999  | Janky         | H04L 69/04   |
|           |   |   |         |               | 370/313      |
| 6,003,135 | A |   | 12/1999 | Bialick et al.|              |
| 6,088,802 | A |   | 7/2000  | Bialick et al.|              |

(Continued)

FOREIGN PATENT DOCUMENTS

EP       1684182 A1    7/2006
KR    1020060070313    6/2006

(Continued)

OTHER PUBLICATIONS

European Search Report for corresponding European Patent Application No. 07833125.3; Applicant: Data Locker International LLC; dated Nov. 7, 2011; pp. 1-90.

(Continued)

*Primary Examiner* — Hashem Farrokh
(74) *Attorney, Agent, or Firm* — Hovey Williams LLP

(57) ABSTRACT

A security system for an external data storage apparatus and control method thereof are disclosed. The system utilizes a preset identification (ID) and input ID to selectively permit data to be written and/or read.

26 Claims, 2 Drawing Sheets

(56) References Cited

U.S. PATENT DOCUMENTS

| | | | |
|---|---|---|---|
| 6,640,306 B1* | 10/2003 | Tone | H04L 29/06027 726/26 |
| 6,857,076 B1 | 2/2005 | Klein | |
| 7,069,447 B1 | 6/2006 | Corder | |
| 7,136,995 B1 | 11/2006 | Wann | |
| 7,272,723 B1 | 9/2007 | Abbott | |
| 7,386,734 B2 | 6/2008 | Wann et al. | |
| 7,823,198 B2* | 10/2010 | Miller | G06F 21/78 711/145 |
| 8,438,647 B2 | 5/2013 | Jevans | |
| 2002/0069363 A1* | 6/2002 | Winburn | G06F 21/64 726/4 |
| 2004/0054863 A1* | 3/2004 | Harada | G06F 21/10 711/164 |
| 2004/0123127 A1* | 6/2004 | Teicher | G06F 21/78 713/193 |
| 2005/0259458 A1 | 11/2005 | Rustagi et al. | |
| 2006/0015753 A1 | 1/2006 | Drehmel et al. | |
| 2006/0019607 A1* | 1/2006 | Kim | H04M 1/72527 455/67.14 |
| 2006/0036872 A1 | 2/2006 | Yen | |
| 2006/0075244 A1* | 4/2006 | Schumann | G06F 21/10 713/176 |
| 2006/0107058 A1* | 5/2006 | Lewis | H04L 9/3271 713/176 |
| 2006/0143367 A1 | 6/2006 | Dubal et al. | |
| 2008/0126589 A1* | 5/2008 | Husain | G06F 3/023 710/14 |
| 2008/0215841 A1 | 9/2008 | Bolotin | |
| 2009/0055576 A1 | 2/2009 | Nakanishi et al. | |
| 2009/0063802 A1 | 3/2009 | Johnson | |
| 2009/0216982 A1 | 8/2009 | Johnson | |
| 2010/0017575 A1 | 1/2010 | Kim | |
| 2010/0088527 A1 | 4/2010 | Johnson | |
| 2010/0287373 A1 | 11/2010 | Johnson | |
| 2011/0047604 A1 | 2/2011 | Bolotin | |

FOREIGN PATENT DOCUMENTS

| | | |
|---|---|---|
| KR | 100641884 | 10/2006 |
| KR | 100656676 | 12/2006 |
| WF | WO03056441 | 7/2003 |
| WO | WO03/027816 A1 | 4/2003 |
| WO | WO2007014074 | 2/2007 |

OTHER PUBLICATIONS

U.S. Appl. No. 61/595,631, filed Jul. 21, 2005; Inventor: Bolotin; Title: Memory Lock System.

ClevX, LLC for Corsair Memory; Flash Padlock TM Self-Secured and Host-Independent USB Flash Drive, White Paper, ClevX, Clever Extensions, Apr. 2007, pp. 1-5, www.clevx.com.

Archived News—2007: Corsair Memory launched Flash PadLock TM based on licensed DataLock TM technology from ClevX, Aug. 16, 2007, 1 page, http://clevx.com/newsarchive2007.html.

Corsair releases "Flash Padlock" PIN-based flash drive, By Conrad Quiltry-Harper, posted Aug. 18, 2007, pp. 1-4, http://www.engadget.com/2007/08/18/corsair-releases-flash-padlock-pin-based-flash-drive/.

* cited by examiner

US 9,875,194 B2

SECURITY SYSTEM FOR EXTERNAL DATA STORAGE APPARATUS AND CONTROL METHOD THEREOF

RELATED APPLICATIONS

This application is a continuation of application Ser. No. 11/920,992, filed Oct. 7, 2009, which is a National Phase filing from PCT Application Number PCT/KR2007/004811, filed on Oct. 2, 2007, which claims priority to Korean Application Number 10-2006-0098204, filed on Oct. 10, 2006, and also claims priority to Korean Application Number 10-2007-0099043, filed on Oct. 2, 2007, the entire disclosures of which are hereby incorporated by reference.

TECHNICAL FIELD

The present invention relates generally to an external data storage apparatus. More particularly, the present invention relates to a security system for an external data storage apparatus and a control method thereof, in which a data storage is driven by reading an identification (ID), which is input through a key input unit for the purpose of security of the external data storage apparatus, and then checking whether or not the read ID is equal to a previously registered ID, thereby preventing data from leaking out and being damaged in advance by another person, and safely protecting the data of a user.

BACKGROUND ART

In general, an external data storage apparatus of which we make use includes a hard disc or a memory device, an external case in which the hard disc, memory device or the like is held, and an interface interfaced with a personal computer.

Currently, this external data storage apparatus has a simple configuration, and is in wide use due to a compact size, easy portability, and convenient storage and management of the data on the basis of the connection with the personal computer.

However, the existing external data storage apparatuses have an advantage in that, after they are connected with the personal computer or another storage medium through which the data can be input and output, the data is very easily and simply input and output by operating a keyboard, whereas they have a disadvantage in that, because the data can be easily input and output by any one as described above, the stored data can be easily exposed to another person due to loss or careless management.

For example, the existing external data storage apparatuses have another disadvantage in that the security for personal information is very weak, because anyone can be read out the data recorded in the external data storage apparatuses by separating only the hard disc from the case and then connecting the hard disc to the personal computer, and because such data can be damaged on purpose.

DISCLOSURE

Technical Problem

The present invention has been made to solve the above problem occurring in the prior art, and an object of the present invention is to provide a security system for an external data storage apparatus and a control method thereof, in which specific identifications (IDs) are set for the respective devices, thereby preventing data from being exposed or damaged by another person, who is not authorized by a user, in advance.

It is another object of the present invention to provide a security system for an external data storage apparatus and a control method thereof, capable of preventing stored data from leaking out although only a hard disc is separated from the external data storage apparatus and then is mounted on a terminal, such as a personal computer, of another person.

Technical Solution

In order to accomplish the above objects, the present invention comprises the following embodiments.

According to a first embodiment, a security system for an external data storage apparatus comprises: a data storage, in which data is stored; a high-speed serial bus, which connects a data terminal, which read and write the data stored in the data storage, and the data storage; a key input unit, which converts an identification (ID), which is input by operation of a user, to an electrical signal and outputs the converted signal; a memory, which stores and sets the ID input by the key input unit; and a control circuit, which, when the ID input by the key input unit is applied, compares the input ID and the preset ID stored in the memory, drives the data storage based on the compared result, and re-arranges storage sectors of the data storage when the data terminal connected with an error of the ID or without input of the ID provides access.

According to a second embodiment, in addition to the first embodiment, the control circuit comprises: a security processor, which compares the ID applied through the key input unit and the preset ID and outputs an ID equality signal when the IDs are equal to each other; and a data storage controller, which records normal file system information in a boot information sector and a file system information sector of the data storage when the ID equality signal of the security processor is received, and normally drives the data storage.

According to a third embodiment, in addition to the second embodiment, the control circuit further comprises a high-speed serial bus controller, which detects whether or not the high-speed serial bus is connected with the data terminal when the ID equality signal of the security processor is applied.

According to a fourth embodiment, in addition to the third embodiment, the data storage controller re-arranges the storage sectors of the data storage in real time when the high-speed serial bus controller detects that the high-speed serial bus is disconnected from the data terminal or when an ID non-equality signal is applied by the security process.

According to a fifth embodiment, in addition to the third embodiment, the data storage controller records unrecognizable virtual data in the boot and file system information sectors of the data storage when an ID non-equality signal of the security processor or a disconnection detecting signal of the high-speed serial bus is received.

According to a sixth embodiment, a method of controlling a security system for an external data storage apparatus, in which the security system of the external data storage apparatus is driven, comprising: an inter-apparatus connection determining step of determining whether or not to be connected with a data terminal requesting input and output of data; an ID comparing step of comparing an input identification (ID) and a preset ID according to an ID input set mode signal; and a data storage driving step of re-arranging storage sectors of a data storage, in which the data is stored, or recording wrong information on a file system when the IDs are not equal to each other or when the connection with the data terminal is released, preventing an unauthorized data terminal from reading and writing the data stored in the data storage, and thereby preventing the data from leaking out.

According to a seventh embodiment, in addition to the sixth embodiment, the ID comparing step comprises a step of selecting any one of an ID input mode for comparison with the ID set by an input signal and an ID re-record mode for changing the ID set by an input signal.

According to an eighth embodiment, in addition to the sixth embodiment, the data storage driving step further comprises a step of recording normal file information in a boot information sector and a file system information sector of the data storage and enabling reading and writing of the data storage when the input ID is equal to the preset ID.

According to a ninth embodiment, in addition to the sixth embodiment, the data storage driving step further comprises a mode selection determining step of determining which one of a record mode of file system information of the data storage and a re-arrangement mode of storage sectors of the data storage is selected.

According to a tenth embodiment, in addition to the ninth embodiment, the mode selection determining step comprises a step of storing information, which cannot be recognized by the data terminal, in a boot information sector and a file system information sector of the data storage, when the connection of the data terminal is released by the selection of the record mode.

According to an eleventh embodiment, in addition to the ninth embodiment, the mode selection determining step comprises a step of re-arranging the storage sectors in real time during reading and writing data stored in the data storage, when the re-arrangement mode of storage sectors is selected and when the input ID is equal to the preset ID.

According to a twelfth embodiment, in addition to any one of the sixth through eleventh embodiments, the method further comprises a message outputting step of outputting the ID mode selection, the mode that is set in the step of selecting any one of the record mode and re-arrangement mode of the data storage, and the driven state of the data storage, to the display.

Advantageous Effects

As described above, the security system for an external data storage apparatus and the control method thereof according to the present invention can prevent important personal information from leaking out by another person in advance due to a loss and careless management of the external data storage apparatus in which the important personal information is stored. Further, it can prevent the data from leaking out and being damaged by another person in advance and safely protect the data of the user, because the security of the data can be maintained as long as the ID is not correctly input although the external data storage apparatus is directly mounted on another data terminal.

DESCRIPTION OF SYMBOLS OF MAIN PARTS IN DRAWINGS

Figure 1:
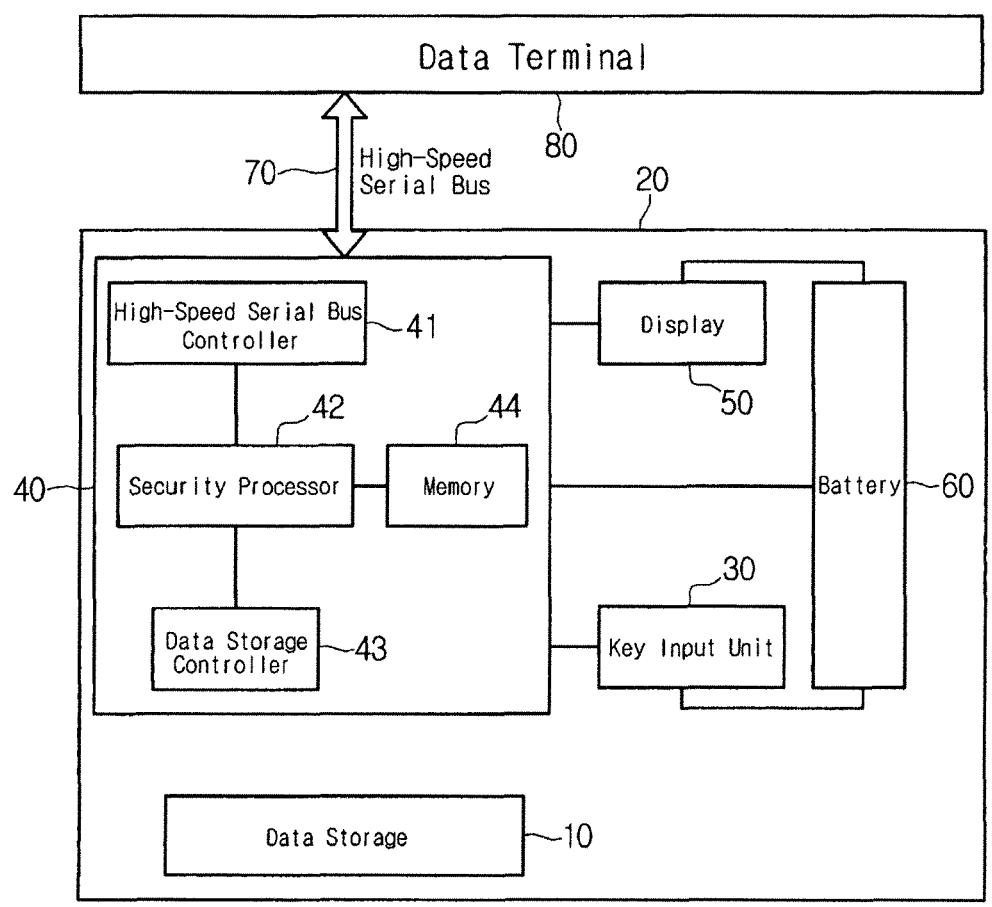
FIG. 1 is a block diagram illustrating a security system for an external data storage apparatus according to the present invention.

10: data storage
20: external case
30: key input unit
40: control circuit
41: high-speed serial bus controller
42: security processor
43: data storage controller
44: memory
50: display
60: battery
70: high-speed serial bus
80: data terminal

MODE FOR INVENTION

Hereinafter, the exemplary embodiments of a security system for an external data storage apparatus and a control method thereof according to the present invention will be described in greater detail with reference to the accompanying drawings.

FIG. 1 is a block diagram illustrating a security system for an external data storage apparatus according to the present invention.

Referring to FIG. 1, the security system for an external data storage apparatus according to the present invention comprises: a data storage 10, in which data is stored; an external case 20, in which the data storage is held; a key input unit 30, which outputs an input signal through a key pad operated by a user; a control circuit 40, which controls data input and output of the data storage; a display 50; a battery 60, which supplies power; and a high-speed serial bus 70, which sends the data to the data storage.

The data storage 10 includes a hard disc or a memory disc, and stores data input from a personal computer or another storage medium (hereinafter, referred to as "data terminal") through which the data can be input and output, and outputs the data at the request of the data terminal, which can input and output the data into and from the data storage 10.

The external case 20 is used as an ordinary housing, and includes the data storage 10, the control circuit 40 and the battery 60 are held therein. The key input unit 30, which is electrically connected with the data storage 10, and the display 50 are provided on an outer surface of the external case 20.

The key input unit 30 is an input device that is combined with character or numeral keys, for example, numeral keys consisting of 1, 2, 3, 4, 5, 6, 7, 8, 9 and 0, and outputs an electrical signal set for each key according to the operation of a user. Thus, the key input unit 30 outputs various input signals according to the operation of a user, for instance a mode change signal for setting or registering a first identification (ID) of the user and a security mode selection setting signal for preventing the data stored in the data storage 10 from being read and written when directly mounted on the data terminal.

Here, the key input unit 30 can select a drive mode of the data storage 10 when the data terminal requests the data stored in the data storage 10, which will be described using a flow chart of FIG. 2.

The control circuit 40 comprises: a high-speed serial bus controller 41, which controls input and output of the data transmitted/received through the high-speed serial bus 70; a security processor 42, which compares a key input signal and an ID to thereby permit the data to be input into and output from the data storage 10; a data storage controller 43, which controls the data storage 10 to be driven; and a memory 44, in which set IDs are stored.

The memory 44 registers and manages the IDs input from the key input unit 30, and boot and file system information sectors of the data storage 10, and thus registers a new ID input according to an ID change mode selection signal of the key input unit 30.

The high-speed serial bus controller 41 detects the state of the high-speed serial bus 70 to determine whether or not the external data storage apparatus is connected with the data terminal 80. When detecting disconnection, the high-speed serial bus controller 41 outputs a disconnection detection signal to the security processor 42, and intercepts the data input and output of the data storage 10 on the basis of a control signal of the security processor 42.

The security processor 42 compares the ID input through the key input unit 30 with the previously registered ID, and determines whether or not the two IDs are equal to each other. Here, the security processor 42 determines whether the input of the key input unit 30 is an ID input mode or an ID change mode. In the case of the ID input mode, the security processor 42 compares the ID input through the key input unit 30 with the set ID stored in the memory 44, and outputs an ID equality signal.

At this time, as described above, the security processor 42 outputs a drive instruction signal of the data storage 10 to the data storage controller 43 according to the mode selection signal of the data storage 10 which is selected by the key input unit 30. When the IDs are equal to each other, the security processor 42 outputs a connection state detection signal of the high-speed serial bus 70 to the high-speed serial bus controller 41.

Thus, if a file system record mode (hereinafter, referred to as "first mode") of the data storage 10 is selected by the key input unit 30, a first mode selection signal is applied to the data storage controller 43 so as to record the file system information of the data storage 10. Further, if a storage sector re-arrangement mode (hereinafter, referred to as "second mode") of the data storage 10 is selected by the key input unit 30, a second mode selection signal is output so as to rearrange storage sectors of the data storage 10.

When the ID equality signal is output from the security processor 42, the data storage controller 43 normally drives the data storage 10 so as to enable the data terminal 80 to read and write the data stored in the data storage 10 through the high-speed serial bus 70, because normal file system information is recorded in the boot and file system information sectors of the data storage 10.

Afterwards, when the disconnection detecting signal detecting the disconnected state of the data terminal 80 is applied from the high-speed serial bus controller 41, the data storage controller 43 controls any data terminal to input a correct ID according to the first or second mode selection signal set by the security processor 42, such that the data stored in the data storage 10 does not leak out through a terminal other than the data terminal, which is authorized to access the data storage 10.

In other words, in order for an unauthorized data terminal 80, on which only the data storage 10 is separated and mounted, not to read out the data stored in the data storage 10, the external data storage apparatus prevents the data stored in the data storage 10 from leaking out using the first and second modes.

Thus, when the first mode is selected, the data storage controller 43 records wrong information in the boot and file system information sectors of the data storage 10 in a format, which cannot be read out of the boot and file system information sectors by the data terminal (for example, the Windows based computer), thereby preventing only the data storage 10 from being separated and connected to the other terminal without inputting the ID.

Further, when the second mode is selected, the data storage controller 43 re-arranges the storage sectors of the data storage 10 in real time, outputs location signals of the storage sectors, and enables the data terminal 80 normally inputting the equal ID to be connected to the data storage 10.

More specifically, when the data storage 10 is normally driven, the data storage controller 43 first re-arranges the storage sectors, and outputs the location signals of the storage sectors. Thus, the data terminal 80 recognizes locations of the storage sectors re-arranged by the data storage controller 43 to read in the corresponding sector. This is performed by the data storage controller 43 in real time. Thus, in the case in which only the data storage 10 is separated and connected directly to the data terminal 80, the data storage controller 43 does not inform the locations of the changed storage sectors, so that the data cannot be read out of and written in the data storage 10.

The display 50 outputs messages sent from the high-speed serial bus controller 41, the security processor 42, the data storage controller 43, and the memory 44, as well as the current state connected with the high-speed serial bus 70, the input mode or the change mode of the ID, and the information on which one of the first and second modes is selected.

The battery 60 supplies power capable of independently driving the data storage 10 and the control circuit 40 without separately supplying external power. In the case in which the data terminal is connected through the high-speed serial bus 70, the battery 60 can be charged using power supplied from the data terminal 80.

The high-speed serial bus 70 transmits/receives the data between the external data storage apparatus and the data terminal, and preferably includes universal serial bus (USB), IEEE1394, and serial advanced technology attachment (SATA).

The operation of the security system for the external data storage apparatus according to the present invention, which includes the configuration as described above, will be described in detail using a flow chart of FIG. 2.

Figure 2:
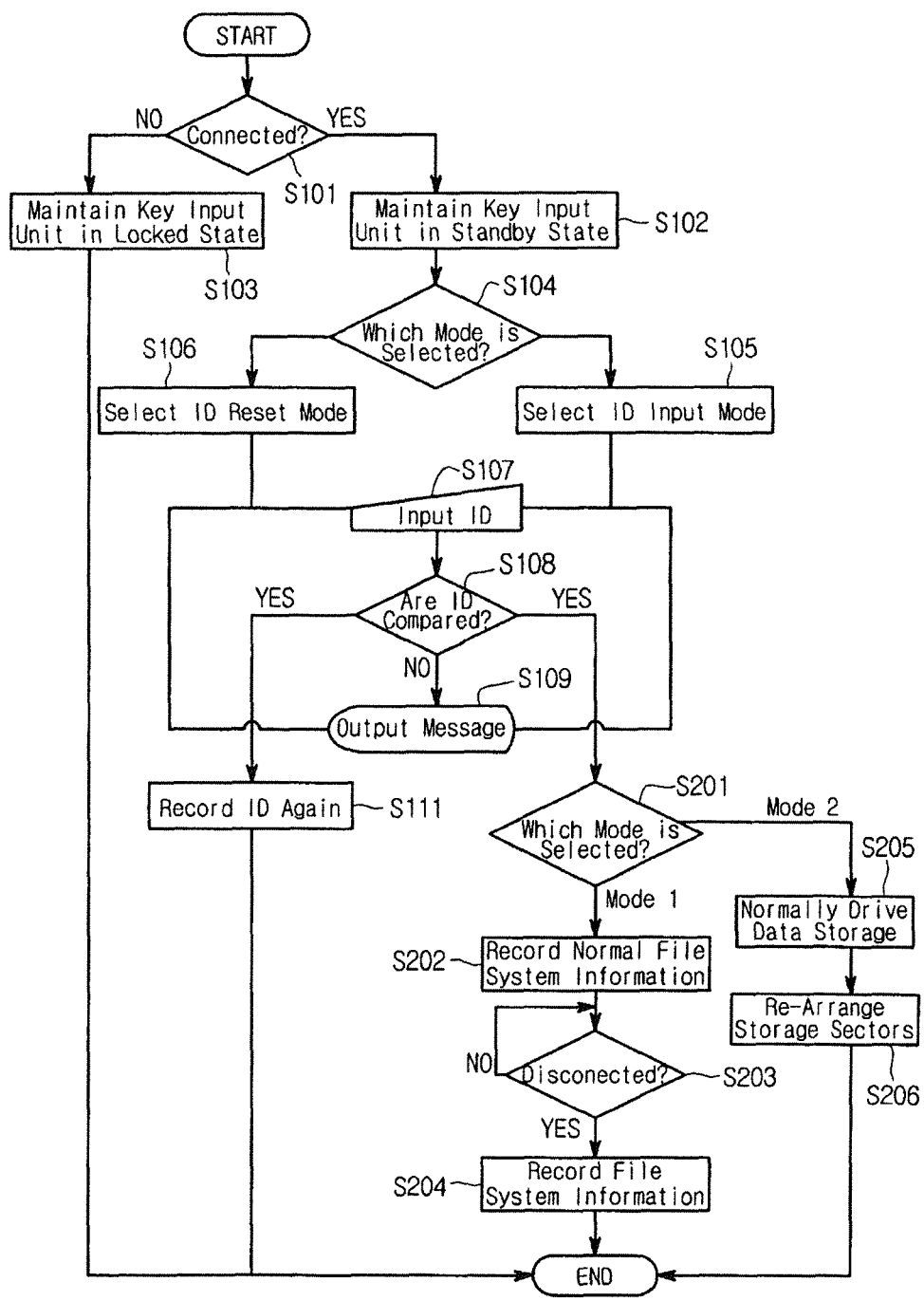
FIG. 2 is a flow chart illustrating a method of controlling a security system for an external data storage apparatus according to the present invention.

FIG. 2 is a flow chart for explaining a method of controlling an external data storage apparatus according to the present invention.

Referring to FIG. 2, the method of controlling an external data storage apparatus according to the present invention comprises: step S101 of detecting the connection between the external data storage apparatus and the data terminal 80, step S102 of maintaining the key input unit 30 in a standby state, step S103 of maintaining the key input unit 30 in a locked state when the data terminal 80 is not connected, step S104 of determining which one of the input and reset modes of the ID is selected in the standby state of the key input unit, step S108 of comparing the input ID and the set ID when the input mode of the ID is selected in step S104, steps S106 and S111 of re-registering the input ID when the reset mode of the ID is selected in step S104, and steps S201 through S206 of driving the data storage 10 when the IDs are equal to each other in step S108.

Here, in step S101, the control circuit 40 determines whether or not a user connects the high-speed serial bus 70 to the input port of the data terminal. Thus, when the high-speed serial bus 70 is connected to the data terminal 80, the control circuit 40 turns on the key input unit 30, and converts the key input unit 30 in a standby state.

In step S102, the key input unit 30 is turned on by the power output from the battery 60 according to control of the control circuit 40, and enters the standby state for driving according to an input signal from the built-in keyboard having a plurality of keys.

In step S103, the control circuit 40 does not detect that the high-speed serial bus 70 is connected to the data terminal. This state is an off state in which the power output from the battery 60 is not applied.

In step S104, the user selects the input or reset mode of the ID using the keyboard of the key input unit 30. Thus, the control circuit 40 determines whether or not a mode selection signal applied by the key input unit 30 is based on the input or reset mode of the ID.

In step S111, when a mode selection signal is based on the reset mode of the ID, the control circuit 40 overwrites an input signal input subsequently on top of the preset ID of the memory 44, thereby re-registering the ID.

In step S108, when a mode selection signal applied by the key input unit 30 is based on the input mode of the ID, the control circuit 40 compares an input signal input subsequently with a set ID stored in the memory 44, thereby determining whether or not the data terminal is authorized to provide access to the data storage 10.

Preferably, the display 50 displays the mode selection of the key input unit 30, as well as a security mode of the data storage 10 and an instruction selected and input through the key input unit 30, both of which will be described below, according to the control of the control circuit 40.

In steps S201 through S206, since the security processor 42 of the control circuit 40 outputs an ID equality signal when the IDs are equal to each other in step S108, the data storage controller 43 authorizes the data terminal 80 to access the data storage so as to enable the data to be read out of and written in the data storage.

In addition, in the steps of driving the data storage 10, the data storage 10 is controlled using the first and second security modes for detecting the disconnection from the data terminal to prevent the data stored in the data storage 10 from leaking out.

More specifically, the external data storage apparatus is generally used in a manner such that the data storage 10 is held in the housing and is connected to the input port (for example, USB) of the data terminal through the high-speed serial bus 70 as described above. However, this external data storage apparatus may be used not only by connecting the data terminal with the high-speed serial bus 70, but also by separating only the data storage 10 from the external data storage apparatus and then directly connecting the separated data storage to hardware of the data terminal. Thus, the present invention sets the ID in order to authorize the data terminal, which is used by an authorized user when connected with the data terminal, to access the data storage, and simultaneously resets the storage sectors or file system information of the data storage 10 in order to prevent an unauthorized user from separating only the data storage 10 and directly mounting the separated data storage on the data terminal 80 when in use, so that it enables the unauthorized user to prevent the data from leaking out.

As for steps S201 through S206 of driving the data storage, when the IDs are equal to each other in step S108, the security processor 42 reads out a security mode set for the memory 44 to determine whether the security mode is the first mode (the file system record mode) or the second mode (the storage sector re-arrangement mode) (security mode selecting step S201). When the first mode is selected in the step of selecting the security mode, the file system information of the data storage 10 is recorded as normal information, and then the data storage is normally driven (first mode normal driving step S202). It is determined whether or not the state connected with the data terminal is released (first mode disconnection detecting step S203). When the state connected with the data terminal is released, the file system information of the data storage 10 is recorded as arbitrary unrecognizable information, and thereby the data storage 10 is intercepted (file system information recording step S204). When the second mode is selected, the data storage is normally driven (second mode normal driving step S205). The storage sectors of the data storage 10 are re-arranged in real time during the normal driving of the data storage (storage sector re-arranging step S206).

In the security mode selecting step S201, the security processor 42 determines which one of the first mode and the second mode is selected according to the mode selection signal input through the key input unit 30 or the mode selection information stored in and set for the memory 44.

In the first mode normal driving step S202, when the security processor 42 outputs the first mode selection signal in the security mode selecting step S201, the data storage controller 43 records normal information, for instance data having a format which a Windows based computer can recognize, in the boot and file system information sectors of the data storage 10 so as to enable the data terminal to recognize the data stored in the data storage 10, thereby authorizing the data terminal to provide access to the data storage 10.

In the first mode disconnection detecting step, when an ID equality signal of the security processor 42 is applied, the high-speed serial bus controller 41 detects the state in which the high-speed serial bus 70 is connected with the data terminal, and outputs the detected signal to the data storage controller 43. Thus, the data storage controller 43 performs the following file system information recording step when the high-speed serial bus controller 41 detects that the data terminal 80 is disconnected from the high-speed serial bus 70.

In the file system information recording step S204, when the disconnection detecting signal of the high-speed serial bus controller 41, which detects the disconnection of the high-speed serial bus 70, is applied, the data storage controller 43 records arbitrary file information, which cannot be recognized from the boot and file system information sectors of the data storage 10 by the data terminal 80, and thus the data terminal 80 is abnormally connected to the data storage 10 without inputting an correct ID, so that the data is prevented from leaking out to the unauthorized data terminal 80. Although any unauthorized user tries to mount only the data storage 10 on his/her own data terminal 80 and make use of the data storage 10 without inputting the ID, the data terminal 80 of the unauthorized user cannot recognize the data stored in the data storage 10 due to the wrong file information recorded in the file system information sector.

In addition, in the second mode normal driving step S205, when the second mode selection signal and the ID equality signal of the security processor 42 is applied in the security mode selecting step, the data is input and output between the data storage 10 and the data terminal according to the control of the data storage controller 43.

Here, like the first mode normal driving step S202, in the second mode normal driving step S205, the data stored in the data storage 10 can be recognized by the data terminal by recording normal information in the boot and file system information sectors of the data storage 10, or the access of the data terminal can be authorized by the connection of the high-speed serial bus 70 without recording the file system information of the data storage 10. This can be variously modified according to the application of the user.

In the storage sector re-arranging step S206, when the second mode normal driving step S205 is initiated, the data storage controller 43 re-arranges the storage sectors of the data storage 10 in real time, sends the changed locations of the storage sectors to the data terminal, and enables the data terminal, which inputs the equal ID, to read and write the data stored in the data storage 10.

More specifically, in order to read and write the data stored in the data storage 10, the sectors of the data storage 10 must be designated. Hence, the data terminal 80 must receive the location signals of the changed sectors, which the data storage controller 43 re-arranges the storage sectors in real time and then sends, to recognize the locations of the changed sectors. Thereby, the data terminal 80 can read and write the data stored in the data storage 10.

For example, however, in the storage sector re-arranging step S206, when only the data storage 10 is separated and connected directly to the interior of the data terminal 80, the data storage controller 43 is disconnected from the data storage 10, and thus does not inform the re-arranged locations of the storage sectors. As such, the data terminal 80, which is connected in this abnormal method, cannot read or write the data stored in the data storage 10.

The invention claimed is:

1. A secure external data storage apparatus comprising:
   an external case;
   a hard disc held within the external case;
   a bus comprising a universal serial bus (USB) connection configured for selective connection to and disconnection from a USB port of a personal computer;
   a display provided on the outer surface of the external case;
   a key input provided on the outer surface of the external case; and
   a control circuit held within the external case and operable to control access of the personal computer to the hard disc based on an input ID entered through the key input unit,
   wherein said control circuit is configured to maintain said key input in a locked state by not providing for power to be applied to said key input when said external data storage apparatus is not connected to the personal computer, and wherein said control circuit is configured to maintain said key input in a standby state by providing for power to be applied to said key input when said external data storage apparatus is connected to the personal computer.

2. The external data storage apparatus of claim 1, wherein the key input is a key pad.

3. The external data storage apparatus of claim 1, wherein the key input comprises character keys.

4. The external data storage apparatus of claim 1, wherein the key input comprises numeral keys.

5. The external data storage apparatus of claim 1, wherein the key input comprises character keys and numeral keys.

6. The external data storage apparatus of claim 1, wherein the key input comprises individual numeric keys consisting of 1, 2, 3, 4, 5, 6, 7, 8, 9, and 0.

7. The external data storage apparatus of claim 1, wherein the key input is configured to allow a user to select between modes of operation of the external data storage apparatus using the key input.

8. The external data storage apparatus of claim 7, wherein the modes of operation include one or more of an initial ID registration mode, an ID reset mode, and an ID input mode.

9. The external data storage apparatus of claim 1, wherein the key input is separate from the display.

10. The external data storage apparatus of claim 1, wherein the display is configured to indicate whether or not the USB connection is connected to the USB port.

11. The external data storage apparatus of claim 1, wherein the display is configured to indicate modes of operation of the external data storage apparatus.

12. The external data storage apparatus of claim 11, wherein the modes of operation include one or more of an initial ID registration mode, an ID reset mode, and an ID input mode.

13. The external data storage apparatus of claim 1, wherein the display is configured to output messages sent from the control circuit.

14. The external data storage apparatus of claim 1, wherein the control circuit comprises a USB controller for detecting whether or not the USB connection is connected to the USB port.

15. The external data storage apparatus of claim 1, wherein the control circuit comprises a memory configured to store a preset ID, wherein said control circuit is operable to control access of the personal computer to the hard disc based on a comparison of the input ID to the preset ID.

16. The external data storage apparatus of claim 15, wherein the memory is configured to permit replacement of the preset ID with a new ID entered through the key input.

17. The external data storage apparatus of claim 1, wherein the control circuit comprises a security processor for controlling access of the personal computer to the hard disc based on the input ID.

18. The external data storage apparatus of claim 1, wherein the control circuit comprises a hard disc controller for driving the hard disc when access of the personal computer to the hard disc is permitted.

19. The external data storage apparatus of claim 1, wherein the control circuit comprises a USB controller for detecting whether or not the USB connection is connected to the USB port, a memory for storing a preset ID, a security processor for controlling access of the personal computer to the hard disc based on a comparison of the input ID and the preset ID, and a hard disc controller for driving the hard disc when the input ID matches the preset ID.

20. The external data storage apparatus of claim 19, wherein the display is configured to output messages sent from the USB controller, the memory, the security processor, or the hard disc controller.

21. The external data storage apparatus of claim 20, wherein the display is configured to output messages sent from the USB controller, the memory, the security processor, and the hard disc controller.

22. The external data storage apparatus of claim 1, wherein the hard disc is operable to store data in a configuration that prevents data on the hard disc from being read out of the hard disc if the hard disc is physically separated from the external data storage apparatus.

23. The external data storage apparatus of claim 1, wherein the control circuit comprises a hard disc controller operable to provide information necessary to read out data stored on the hard disc.

24. The external data storage apparatus of claim 1, wherein the control circuit comprises a hard disc controller operable to manipulate in real time data written to the hard disc to prevent data on the hard disc from being read out of the hard disc by an unauthorized user.

25. The external data storage apparatus of claim 24, wherein the hard disc controller is operable to re-arrange in real time storage sectors of the hard disc to prevent data on the hard disc from being read out of the hard disc by an unauthorized user.

26. The external data storage apparatus of claim 1, further comprising a battery for providing power to said data storage apparatus, wherein said control circuit is configured to provide power from said battery to said key input to maintain said key input in the standby state when said external data storage apparatus is connected to the personal computer, and wherein said control circuit is configured to restrict power from being provided from said battery to said key input to maintain said key input in the locked state when said external data storage apparatus is not connected to the personal computer.

\* \* \* \* \*